United States Patent
Ueno et al.

(10) Patent No.: US 9,328,178 B2
(45) Date of Patent: May 3, 2016

(54) METHOD FOR PRODUCING ETHYLENE-TETRAFLUOROETHYLENE COPOLYMER POWDER

(71) Applicant: ASAHI GLASS COMPANY, LIMITED, Chiyoda-ku (JP)

(72) Inventors: Katsuya Ueno, Tokyo (JP); Atsushi Tsuji, Tokyo (JP); Akio Ogawa, Tokyo (JP); Yasuhiro Suzuki, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 55 days.

(21) Appl. No.: 14/161,025

(22) Filed: Jan. 22, 2014

(65) Prior Publication Data

US 2014/0135465 A1    May 15, 2014

Related U.S. Application Data

(63) Continuation of application No. PCT/JP2012/068336, filed on Jul. 19, 2012.

(30) Foreign Application Priority Data

Jul. 19, 2011 (JP) .................................. 2011-157879

(51) Int. Cl.
| | |
|---|---|
| C08J 3/12 | (2006.01) |
| C08F 6/10 | (2006.01) |
| C08J 3/16 | (2006.01) |
| C08F 214/26 | (2006.01) |

(52) U.S. Cl.
CPC ............... *C08F 6/10* (2013.01); *C08F 214/265* (2013.01); *C08J 3/12* (2013.01); *C08J 3/16* (2013.01); *C08J 2327/18* (2013.01)

(58) Field of Classification Search
USPC .................................. 526/254, 242
See application file for complete search history.

(56) References Cited

U.S. PATENT DOCUMENTS

2013/0022906 A1 *   1/2013   Chonan et al. ............. 430/109.4

FOREIGN PATENT DOCUMENTS

| EP | 937738 A2 * | 8/1999 |
|---|---|---|
| EP | 2371880 A1 * | 10/2011 |

(Continued)

OTHER PUBLICATIONS

International Search Report issued Oct. 2, 2012 in PCT/JP2012/068336 filed Jul. 19, 2012.

*Primary Examiner* — Peter D Mulcahy
*Assistant Examiner* — Henry Hu
(74) *Attorney, Agent, or Firm* — Oblon, McClelland, Maier & Neustadt, L.L.P

(57) ABSTRACT

Provided is a method for producing an ethylene-tetrafluoroethylene copolymer powder, whereby it is possible to simply and inexpensively produce an ethylene-tetrafluoroethylene copolymer powder excellent in handling efficiency from a slurry having an ethylene-tetrafluoroethylene copolymer dispersed in a fluorinated organic solvent. A method for producing an ethylene-tetrafluoroethylene copolymer powder, which comprises feeding, at a feeding linear velocity exceeding 0.10 m/sec., a slurry having ethylene-tetrafluoroethylene copolymer microparticles dispersed in a specific fluorinated organic solvent, to a centrifugal thin-film evaporator 12 having a cylindrical heat-conducting barrel 34, a first heating portion 44 for heating the heat-conducting barrel 34, and a rotary stirring portion 42 wherein a rotary shaft 38 is provided with stirring blades 40 for rotation in the heat-conducting barrel 34 so that a thin film is formed on the inside wall surface 34*a* of the heat-conducting barrel 34, to obtain an ethylene-tetrafluoroethylene copolymer powder.

15 Claims, 2 Drawing Sheets

(56) References Cited

FOREIGN PATENT DOCUMENTS

| | | |
|---|---|---|
| JP | 61-14910 | 1/1986 |
| JP | 06-306179 | 11/1994 |
| JP | 08-118357 | 5/1996 |
| JP | 11-236454 | 8/1999 |
| JP | 2011-225677 | 11/2011 |
| JP | 2011-225677 A * | 11/2011 |
| WO | 2010/074039 | 7/2010 |
| WO | 2011/007705 | 1/2011 |

* cited by examiner

METHOD FOR PRODUCING ETHYLENE-TETRAFLUOROETHYLENE COPOLYMER POWDER

TECHNICAL FIELD

The present invention relates to a method for producing an ethylene-tetrafluoroethylene copolymer powder.

BACKGROUND ART

An ethylene-tetrafluoroethylene copolymer (hereinafter referred to also as "ETFE") is used in a wide range of fields including automobile components, plastic greenhouses for agriculture, building materials, etc. ETFE is usually produced by solution polymerization of monomers in a fluorinated organic solvent as a polymerization medium. In such a method, a slurry having a relatively high viscosity is obtained wherein ETFE microparticles are suspended. Then, volatile components such as non-reacted monomers, the polymerization medium, etc. are recovered from the slurry, to obtain a powder of ETFE (hereinafter referred to as an "ETFE powder"). By minimizing the residual amount of volatile components in the ETFE powder, it is possible to suppress bubbling at the time of molding the ETFE powder, whereby the processability will be improved. Further, by recovering volatile components from the slurry at a high recovery rate and reusing them, the costs can be reduced.

As methods for producing an ETFE powder by recovering volatile components from the slurry, the following methods (1) and (2) are known.

(1) A method wherein the slurry is subjected to filtration by a glass filter to separate ETFE, which is then heated to vaporize and recover volatile components and to obtain an ETFE powder (Patent Document 1).

(2) A method wherein the slurry is added to water, followed by stirring and heating in such a state that the slurry is dispersed in water, to vaporize and recover volatile components, and then, an operation for solid-liquid separation of ETFE and water is carried out, followed by drying to obtain an ETFE powder (Patent Document 2)

PRIOR ART DOCUMENTS

Patent Documents

Patent Document 1: WO2011/007705
Patent Document 2: WO2010/074039

DISCLOSURE OF INVENTION

Technical Problem

However, in the method (1), ETFE is likely to agglomerate to form large agglomerates, whereby the handing efficiency of the ETFE powder tends to be inadequate, and the yield of the ETFE product tends to be low. Whereas, in the method (2), an ETFE powder having relatively good handling efficiency with an average particle size of about 2 mm is obtainable. However, this method has problems such that an operation for solid-liquid separation of ETFE and water is required after recovery of volatile components, waste water will be formed, and volatile components tend to be dissolved in the waste water so that their recovery rate tends to be lowered, and thus, the method is economically disadvantageous.

The present invention has an object to provide a method for producing an ETFE powder, whereby it is possible to simply and inexpensively produce an ETFE powder excellent in handling efficiency and processability, from a slurry having ETFE dispersed in a polymerization medium.

Solution to Problem

The present invention has adopted the following constructions to solve the above problem.

[1] A method for producing an ETFE powder from a slurry having ETFE microparticles dispersed in a fluorinated organic solvent, by means of a centrifugal thin-film evaporator having a cylindrical heat-conducting barrel, a rotary stirring portion wherein a rotary shaft is provided with stirring blades for rotation in the heat-conducting barrel so that the front edges of the stirring blades skim over the inside wall surface of the heat-conducting barrel, and a heating portion for heating the heat-conducting barrel, characterized in that the fluorinated organic solvent is at least one member selected from the group consisting of a perfluorocarbon, a hydrofluorocarbon, a hydrochlorofluorocarbon and a hydrofluoroether, and the slurry is fed into the heat-conducting barrel at a feeding linear velocity exceeding 0.1 m/sec.

[2] The method for producing an ETFE powder according to the above [1], wherein the angle θ between the feeding direction of the slurry into the heat-conducting barrel and the tangential direction of the inside wall surface at the intersection of an extended line in the feeding direction and the inside wall surface of the heat-conducting barrel, is at most 30°.

The method for producing an ETFE powder according to the above [1] or [2], wherein the concentration of the microparticles in the slurry is from 1 to 15 mass %.

[4] The method for producing an ethylene-tetrafluoroethylene copolymer powder according to any one of the above [1] to [3], wherein the content of the fluorinated organic solvent in the ETFE powder withdrawn from the centrifugal thin-film evaporator, is from 0.0001 to 50 mass %.

[5] The method for producing an ETFE powder according to any one of the above [1] to [4], wherein the slurry is a slurry obtained by solution polymerization of monomers comprising ethylene and tetrafluoroethylene.

[6] The method for producing an ETFE powder according to any one of the above [1] to [5], wherein the average particle size of the ETFE powder withdrawn from the centrifugal thin-film evaporator, is from 10 to 500 μm.

[7] The method for producing an ETFE powder according to any one of the above [1] to [6], wherein the bulk density of the ETFE powder withdrawn from the centrifugal thin-film evaporator, is from 0.4 to 1.8 g/mL.

[8] The method for producing an ETFE powder according to any one of the above [1] to [7], wherein the fluorinated organic solvent is $CF_3(CF_2)_nCF_2H$ wherein n is an integer of from 4 to 18, $CHClCF_2CF_2Cl$, or a mixture thereof.

[9] The method for producing an ETFE powder according to any one of the above [1] to [8], wherein in the ETFE, the molar ratio of repeating units derived from ethylene to repeating units derived from tetrafluoroethylene is from 30/70 to 60/40.

[10] The method for producing an ETFE powder according to any one of the above [1] to [9], wherein the ETFE has repeating units derived from another monomer other than ethylene and tetrafluoroethylene.

[11] The method for producing an ETFE powder according to the above [10], wherein said another monomer is a monomer represented by the following formula (1):

$$CH_2=CR^1-(CF_2)_aR^2 \qquad (1)$$

in the formula (1), each of $R^1$ and $R^2$ which are independent of each other, is a hydrogen atom or a fluorine atom, and a is an integer of from 1 to 12.

Advantageous Effects of Invention

According to the method for producing an ETFE powder of the present invention, it is possible to simply and inexpensively produce an ETFE powder excellent in handling efficiency and processability from a slurry having ETFE dispersed in a polymerization medium.

DISCLOSURE OF EMBODIMENTS

The method for producing an ETFE powder of the present invention is a method to obtain an ETFE powder by removing volatile components such as the fluorinated organic solvent, non-reacted monomers, etc. from the slurry (hereinafter referred to as the "raw material slurry") having microparticles of ETFE (hereinafter referred to as "ETFE microparticles") dispersed in the fluorinated organic solvent, by means of the centrifugal thin-film evaporator. Now, as an example of the method for producing an ETFE powder of the present invention, a method for producing an ETFE powder using a apparatus 1 for the production of an ETFE powder exemplified in FIG. 1 (hereinafter referred to as the "production apparatus 1") will be described.

[Production Apparatus]

Figure 1:
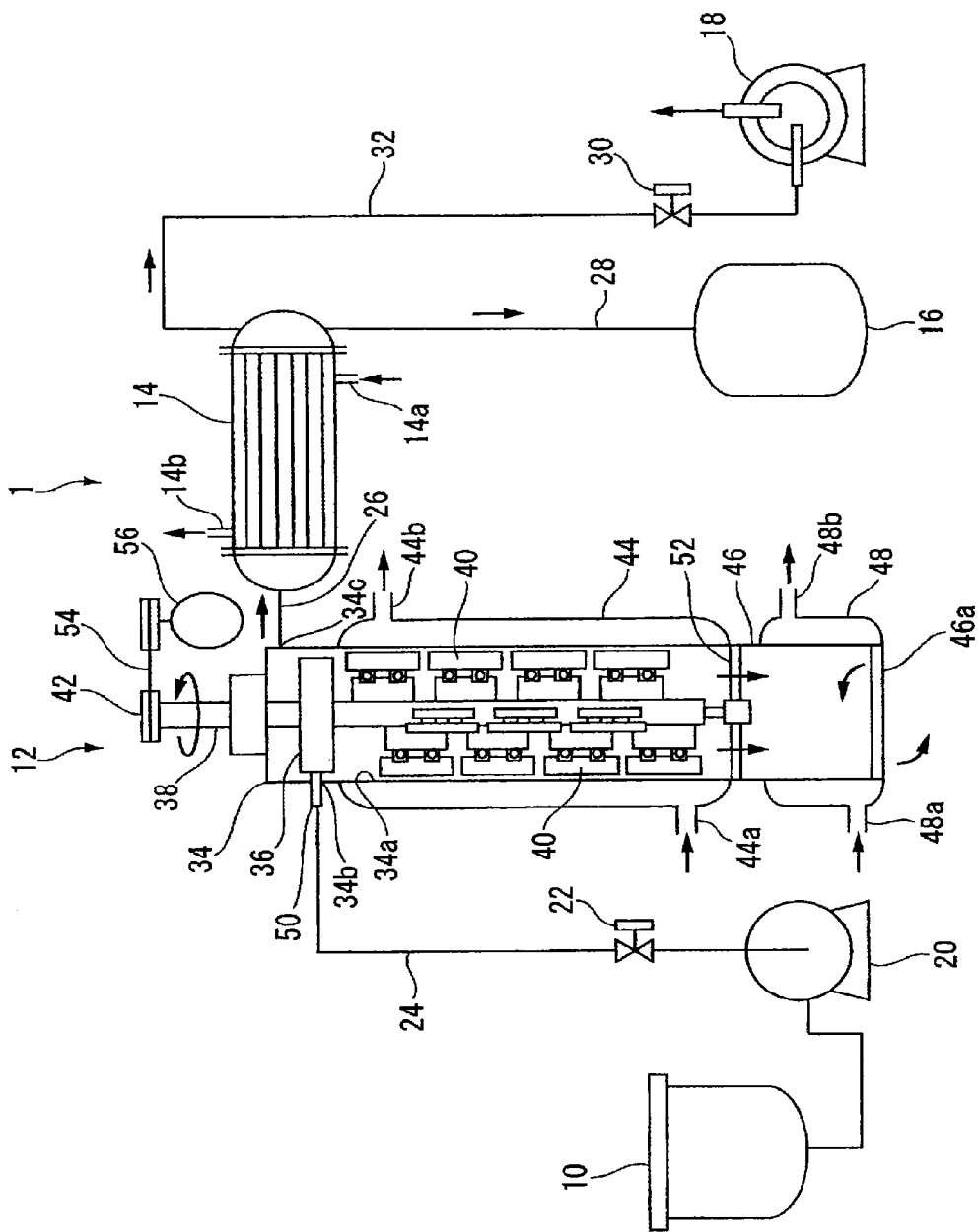
FIG. 1 is a schematic view illustrating an example of the production apparatus to be used for the method for producing an ETFE powder of the present invention.
Figure 2:
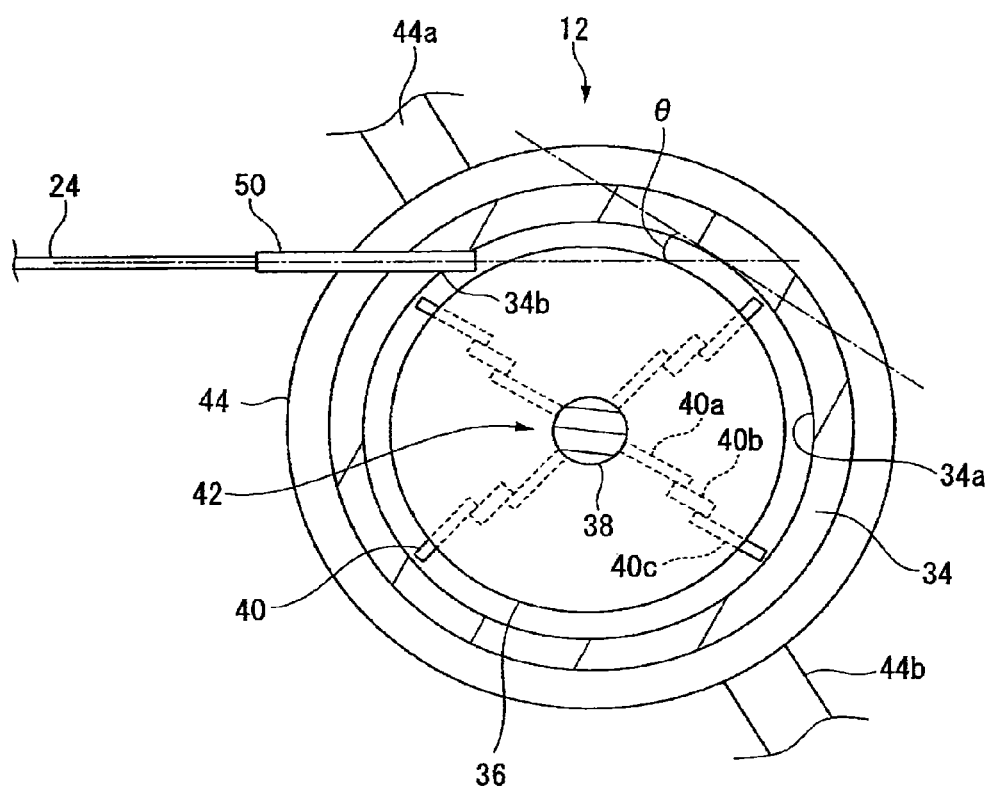
FIG. 2 is a cross-sectional view when the raw material feeding portion of the centrifugal thin-film evaporator in the production apparatus in FIG. 1 is cut in a direction perpendicular to the axial direction.

As shown in FIGS. 1 and 2, the production apparatus 1 to be used for the production method of the present invention has a storage tank 10 to store a raw material slurry, a centrifugal thin-film evaporator 12 to produce an ETFE powder from the raw material slurry to be supplied from the storage tank 10, a condenser 14 to condense volatile components recovered from the centrifugal thin-film evaporator 12, a recovery tank 16 to recover volatile components condensed by the condenser 14, and a blower 18 to aspirate volatile components evaporated from the centrifugal thin-film evaporator 12.

The storage 10 and the centrifugal thin-film evaporator 12 are connected by a piping 24 which is provided with a feeding pump 20 and a back pressure valve 22 from the storage tank 10 side. The centrifugal thin-film evaporator 12 and the condenser 14 are connected by a piping 26, and the condenser 14 and the recovery tank 16 are connected by a piping 28. Further, the condenser 14 and the blower 18 are connected by a piping 32 which is provided with a pressure-adjusting valve 30 on its way.

The centrifugal thin-film evaporator 12 has a cylindrical heat-conducting barrel 34, a dispersing rotor 36 to disperse a raw material slurry fed into the heat-conducting barrel 34 to the inside wall surface 34a, a rotary stirring portion 42 wherein a rotary shaft 38 is provided with stirring blades 40 for rotation in the heat-conducting barrel 34 so that the frond edges of the stirring blades 40 skim over the inside wall surface 34a of the heat-conducting barrel 34, a first heating portion 44 to heat the heat-conducting barrel 34, a powder-receiving portion 46 to receive an ETFE powder falling from the inside of the heat-conducting barrel 34, and a second heating portion 48 to heat the powder-receiving portion 46.

The inner diameter of the cylindrical heat-conducting barrel 34 is preferably from 100 to 3,000 mm, more preferably from 200 to 2,000 mm. Further, the barrel length of the heat-conducting barrel 34 is preferably from 400 to 18,000 mm, more preferably from 800 to 12,000 mm. The stirring rotational speed of the rotary stirring portion 42 is preferably from 30 to 2,500 rpm, more preferably from 50 to 2,000 rpm.

At an upper portion of the heat-conducting barrel 34, a raw material feeding port 34b is formed to feed the raw material slurry.

At the raw material feeding port 34b of the heat-conducting barrel 34, a nozzle 50 provided at the forward end of the piping 24 is installed, and a dispersing rotor 36 is installed at a position corresponding to the raw material feeding port 34b. The forward end of the nozzle 50 is located between the inside wall surface 34a of the heat-conducting barrel 34 and the outside surface of the dispersing rotor 36. That is, from the nozzle 50 at the raw material feeding port 34b, the raw material slurry is fed between the inside wall surface 34a and the outside surface of the rotary shaft 38 at an upper portion of the heat-conducting barrel 34.

The nozzle 50 is preferably installed so that the angle θ (FIG. 2) between the feeding direction of the raw material slurry into the heat-conducting barrel 34 and the tangential direction of the inside wall surface 34a at the intersection of an extended line in the feeding direction and the inside wall surface 34a of the heat-conducting barrel 34, becomes at most 30° and more preferably installed so that such an angle becomes at most 25°. It will be thereby possible that the raw material slurry fed into the heat-conducting barrel 34 will be uniformly supplied to the inside wall surface 34a, and it will be easy to prevent such a localized flow that the raw material slurry locally flows at a part of the inside wall surface 34a. And, the time for the raw material slurry to be heated in the heat-conducting barrel 34 will be sufficiently secured, whereby the volatile components will be sufficiently removed, and an ETFE powder excellent in handling efficiency and processability will more easily be obtainable.

The lower limit value of the angle θ is ideally 0°, but becomes slightly larger than 0° by an angle corresponding to the thickness (the difference between the inner diameter and the outer diameter) of the discharge portion of the nozzle 50.

The dispersing rotor 36 is disk-shaped and installed so that it rotates in conjunction with rotation of the rotary shaft 38 of the rotary stirring portion 42. The raw material slurry fed from the nozzle 50 into the inside of the heat-conducting barrel 34 is uniformly dispersed on the inside wall surface 34a of the heat-conducting barrel 34 by rotation of the dispersing rotor 36, and falls naturally along the inside wall surface 34a.

Further, at an upper portion of the heat-conducting barrel 34, a volatile components-recovering port 34c to recover volatile components evaporated in the inside. The volatile components-recovering port 34c is formed at an upper portion than the raw material feeding port 34b in order to prevent the raw material slurry from being introduced into the condenser 14 through the piping 26. The volatile components-recovering port 34c is connected to the condenser 14 via the piping 26, and by aspiration by a blower 18 connected to the condenser 14, the volatile components evaporated in the heat-conducting barrel 34 will be recovered from the volatile components-recovering port 34c.

The rotary stirring portion 42 has a rotary shaft 38 and a plurality of stirring blades 40 attached to the rotary shaft 38, and the rotary shaft 38 is received by a bearing 52 provided at a lower portion of the heat-conducting barrel 34 and rotates in the inside of the heat-conducting barrel 34.

The rotary shaft 38 is connected at its upper portion to a rotary driving portion 56 via a belt 54 and is rotated by the rotary driving portion 56.

The stirring blades 40 are located below the dispersing rotor 36. Further, the plurality of stirring blades 40 are installed so that their positions are helically displaced sequentially from above along the axial direction of the rotary shaft 38. Specifically, in this example, when the rotary stirring portion 42 is viewed from above, the respective stirring blades 40 are installed as displaced sequentially from above by 90° from one another with the rotary shaft 38 at the center.

Further, a stirring blade 40 has a fixed portion 40a fixed to the rotary shaft 38 and a movable blade portion 40c connected via a connecting portion 40b to the fixed portion 40a, and is inflective with the connecting portion 40b as a pivot point so that the movable blade portion 40c is flexed in a direction opposite to rotation of the rotary shaft 38. It will be thereby possible to avoid such a possibility that an excessive force is exerted to a stirring blade 40 when the front edge of the stirring blade 40 is into contact with a layer of an ETFE powder formed on the inside wall surface 34a of the heat-conducting barrel 34, whereby a damage to the rotary stirring portion 42 tends to be less likely to occur.

The first heating portion 44 is a heating jacket to heat the heat-conducting barrel 34 by circulating a heating medium outside the heat-conducting barrel 34. The heating medium is supplied from a heating medium-feeding port 44 provided at a lower portion and circulated in the heating jacket, and then, from a heating medium-discharging port 44b provided at an upper portion, the heating medium is discharged. The heat-conducting barrel 34 is heated by the heating medium circulated in the first heating portion 44, and the raw material slurry is heated by the inside wall surface 34a of the heat-conducting barrel 34, whereby volatile components in the raw material slurry are evaporated.

As the heating medium for the first heating portion 44, pressurized steam or silicone oil may, for example, be mentioned.

By rotation of the rotary shaft 38, the rotary stirring portion 42 rotates so that the front edges of stirring blades 40 skim over the inside wall surface 34a of the heat-conducting barrel 34, whereby the raw material slurry applied to the inside wall surface 34a of the heat-conducting barrel 34 is made to be a thin film having a thickness which depends upon the clearance between the front edges of the stirring blades 40 and the inside wall surface 34a of the heat-conducting barrel 34. As the raw material slurry is made to be a thin film on the inside wall surface 34a of the heat-conducting barrel 34, the volatile components can be evaporated in a short time.

In order to convert the raw material slurry into a powder form, the clearance between the front edges of the stirring blades 40 and the inside wall surface 34a of the heat-conducting barrel 34 is preferably at least 0.1 mm, more preferably at least 0.3 mm. Further, in order to evaporate the volatile components in a shorter time, the above clearance is preferably at most 2 mm, more preferably at most 1.5 mm.

Here, the above clearance is a clearance in such a state that the angle between the fixed portion 40a and the movable blade portion 40c in a stirring blade 40 is 180° (i.e. not flexed).

The number of stirring blades 40 is not particularly limited, but from 4 to 100 blades are preferred.

Further, when the layer of the ETFE powder formed on the inside wall surface 34a of the heat-conducting barrel 34 has become thicker than the clearance between the front edges of stirring blades and the inside wall surface 34a of the heat-conducting barrel 34, the layer will be into contact with the front edges of the stirring blades 40, will be thereby scraped off, and will fall.

The powder-receiving portion 46 is a portion to receive the ETFE powder falling from the heat-conducting barrel 34, and at its lower portion, a rotary output port 46a is provided, and on its outside, a second heating portion 48 is provided. In the powder-receiving portion 46, the ETFE powder falling from the heat-conducting barrel 34 is heated as the case requires, to adjust the content of the fluorinated organic solvent in the ETFE powder to the desired content, and then, taken out from the output port 46a.

The second heating portion 48 is a heating jacket to heat the powder-receiving portion 46 by circulating a heating medium outside the powder-receiving portion 46. From a heating medium feeding port 48a provided at its lower portion, a heating medium is fed and circulated in the heating jacket, and then, from the heating medium discharge port 48b provided at its upper portion, the heating medium is discharged.

As the heating medium for the second heating portion 48, the same one as mentioned as the heating medium for the first heating portion 44 may be mentioned.

The condenser 14 is a portion to cool and condense the volatile components evaporated in the heat-conducting barrel 34 and recovered from the volatile components-recovering port 34c. The condenser 14 is provided with a cooling medium-feeding port 14a on the downstream side and a cooling medium discharge port 14b on the upstream side and is constructed so that the cooling medium supplied from the cooling medium-feeding port 14a is circulated from the downstream side towards the upstream side and discharged from the cooling medium discharge port 14b. In the condenser 14, the volatile components are condensed by heat exchange between the cooling medium and the volatile components.

The volatile components condensed in the condenser 14 are, via a piping 28, recovered in a recovery tank 16.

[Production Method]

A raw material slurry having ETFE microparticles dispersed in a fluorinated organic solvent is stored in a storage tank 10, and the raw material slurry is transported by a feeding pump 20 and a back pressure valve 22 and fed from a nozzle 50 provided at a raw material-feeding port 34b into a heat-conducting barrel 34 of a centrifugal thin-film evaporator 12. The raw material slurry fed into the heat-conducting barrel 34 is dispersed on the inside wall surface 34a by a dispersing rotor 36, formed into a thin film on the inside wall surface 34a by rotation of a rotary stirring portion 42, and heated while falling naturally, whereby volatile components are evaporated and removed, to form an ETFE powder.

The feeding linear velocity of the raw material slurry fed from the nozzle 50 into the heat-conducting barrel 34 of the centrifugal thin-film evaporator 12 is a velocity exceeding 0.10 m/sec. The raw material slurry is thereby uniformly dispersed over the entire inside wall surface 34a of the heat-conducting barrel 34, and it is possible to form a uniform thin film of the raw material slurry on the inside wall surface 34a. Therefore, it is possible to prevent such a localized flow that the raw material slurry flows locally along a part of the inside wall surface 34a of the heat-conducting barrel 34, whereby the raw material slurry can be sufficiently heated in the heat-conducting barrel 34, and it is possible to obtain an ETFE powder having volatile components such as the fluorinated organic solvent, etc. sufficiently removed. Further, the feeding linear velocity of the raw material slurry is preferably at least 0.11 m/sec., more preferably at least 0.12 m/sec., since it is thereby possible to more easily prevent a localized flow of the raw material slurry and to more effectively remove the volatile components.

Further, the feeding linear velocity of the raw material slurry is preferably at most 2 m/sec., more preferably at most 0.5 m/sec., further preferably at most 0.2 m/sec., since it is thereby unnecessary to use a feeding pump 20 having an excessively large feeding capacity, and it is possible to avoid that the sizes of the nozzle 50 and the raw material feeding port 34b become excessively large.

Here, the feeding linear velocity of the raw material slurry in the production method of the present invention is defined by the following formula (I):

$$V = Q/A \quad (I)$$

In the formula (I), V is a feeding linear velocity (unit: m/sec.), Q is the flow rate (m$^3$/sec.) of the raw material slurry supplied to the nozzle 50, and A is a cross-sectional area (m$^2$) of the spout of the nozzle 50.

The internal temperature of the centrifugal thin-film evaporator 12 is preferably from 30 to 180° C., more preferably from 40 to 150° C., further preferably from 90 to 150° C. When the internal temperature is at least the lower limit value, it is easy to avoid that the centrifugal thin-film evaporator becomes excessively large, and the installation cost can be reduced. On the other hand, when the internal temperature is at most the upper limit value, it is easy to prevent change of properties of ETFE.

Here, the internal temperature of the heat-conducting barrel 34 in the centrifugal thin-film evaporator 12 is the highest temperature during the operation of the inside wall surface 34a at the middle point in the vertical direction of the heat-conducting barrel 34.

The internal pressure of the centrifugal thin-film evaporator 12 is preferably from 1 to 500 kPa (abs), more preferably from 5 to 300 kPa (abs), further preferably from 5 to 200 kPa (abs). When the internal pressure is at least the lower limit value, it is easy to avoid that the installation to be used for the internal pressure reduction and the recovery of the fluorinated organic solvent, becomes excessively large, such being economically advantageous. Further, when the internal pressure is at most the upper limit value, it is easy to avoid that the installation cost to increase the pressure resistance of the centrifugal thin-film evaporator 12, becomes excessively high, such being economically advantageous.

[Raw Material Slurry]

The raw material slurry to be used in the method for producing an ETFE powder of the present invention is a slurry having ETFE microparticles dispersed in a fluorinated organic solvent.

As the raw material slurry, it is preferred to use a slurry obtained by a solution polymerization method using a fluorinated organic solvent.

The fluorinated organic solvent is at least one member selected from the group consisting of a perfluorocarbon (PFC), a hydrofluorocarbon (HFC), a hydrochlorofluorocarbon (HCFC) and a hydrofluoroether (HFE). The structure of the fluorinated organic solvent may be straight-chained, branched or cyclic. Further, PFC, HFC and HCFC may contain etheric oxygen atoms in their molecules.

PFC may, for example, be perfluorocyclobutane, perfluorohexane, perfluoro(dipropyl ether), perfluorocyclohexane or perfluoro(2-butyltetrahydrofuran).

HFC may, for example, be $CH_3OC_2F_5$, $CH_3OC_3F_7$, $C_5F_{10}H_2$ such as $CF_3CFHCFHCF_2CF_2CF_3$, $C_6F_{13}H$ such as $CF_3CF_2CF_2CF_2CF_2CF_2H$, or $C_6F_{12}H_2$ such as $CF_2HCF_2CF_2CF_2CF_2CF_2H$, and a compound having a number of fluorine atoms larger than the number of hydrogen atoms in its molecule is preferred.

HCFC is preferably a compound having at most 3 hydrogen atoms, such as $CHClCF_2CF_2Cl$.

HFE may, for example, be $CF_3CF_2CH_2OCHF_2$, $CF_3CHFCF_2OCH_3$, $CHF_2CF_2OCH_2F$, $(CF_3)_2CHCF_2OCH_3$, $CF_3CF_2CH_2OCH_2CHF_2$ or $CF_3CHFCF_2OCH_2CF_3$.

As the fluorinated organic solvent, one type may be used alone, or two or more types may be used in combination.

The fluorinated organic solvent is preferably a saturated compound, since it presents no influence to the polymerization reaction. Further, the fluorinated organic solvent is preferably at least one member selected from the group consisting of PFC having from 3 to 10 carbon atoms, HFC having from 3 to 10 carbon atoms and HCFC having from 3 to 10 carbon atoms, more preferably $CF_3(CF_2)_nCF_2H$ wherein n is an integer of from 4 to 18, $CF_3CF_2CF_2CF_2CF_2CF_2H$ or a mixture thereof, particularly preferably $CHClCF_2CF_2Cl$, $CF_3CF_2CF_2CF_2CF_2CF_2H$ or a mixture thereof, since it is thereby a liquid at the polymerization temperature, and it can easily be separated from ETFE.

ETFE microparticles in the present invention are preferably particles made of ETFE and having an average primary particle size of from 10 nm to 5 μm. The average primary particle size of ETFE microparticles is more preferably from 50 nm to 1 μm. When the average primary particle size of ETFE microparticles is within such a range, the microparticles are excellent in the applicability to the method for producing an ETFE powder of the present invention. Here, the average primary particle size of ETFE microparticles is a value measured by e.g. an electron microscope, a laser diffraction/scattering type particle size/particle distribution measuring apparatus, or the like.

ETFE is a copolymer having repeating units derived from ethylene (hereinafter referred to as "E") and repeating units derived from tetrafluoroethylene (hereinafter referred to as "TFE").

The molar ratio (E/TFE) of repeating units derived from E to repeating units derived from TFE is preferably from 30/70 to 60/40, more preferably from 40/60 to 55/45, further preferably from 43/57 to 50/50. If the above molar ratio (E/TFE) is less than the lower limit value, the transparency of ETFE tends to be low. If the above molar ratio (E/TFE) exceeds the upper limit value, the heat resistance tends to be remarkably low.

The above molar ratio (E/TFE) is measured by FT-IR.

Further, ETFE may have repeating units derived from another monomer other than E and TFE, in addition to repeating units derived from E and repeating units derived from TFE.

Such another monomer may, for example, be a fluorinated ethylene (other than TFE) such as vinylidene fluoride or trifluorochloroethylene; a fluorinated propylene such as $CF_2=CFCF_3$, $CF_2=CHCF_3$ or $CH_2=CHCF_3$; a monomer represented by the following formula (1) (hereinafter referred to as a "monomer (1)"); a perfluoro vinyl ether such as a monomer represented by the following formula (2); a perfluoro vinyl ether having a group which may easily be converted to a carboxylic acid group or a sulfonic acid group, such as $CH_3OC(=O)CF_2CF_2CF_2OCF=CF_2$ or $FSO_2CF_2CF_2OCF(CF_3)CF_2OCF=CF_2$; a $C_{3-4}$ α-olefin such as propylene or butane; 4-methyl-1-pentene; cyclohexene; a vinyl ester such as vinyl acetate, vinyl lactate, vinyl butyrate or vinyl pivalate; or a vinyl ether such as methyl vinyl ether, ethyl vinyl ether, isobutyl vinyl ether, tert-butyl vinyl ether, cyclohexyl vinyl ether or hydroxybutyl vinyl ether.

$$CH_2=CR^1-(CF_2)_aR^2 \quad (1)$$

$$Rf(OCFR^3CF_2)_bOCF=CF_2 \quad (2)$$

In the formula (1), each of $R^1$ and $R^2$ which are independent of each other, is a hydrogen atom or a fluorine atom, and a is an integer of from 1 to 12. Further, in the formula (2), Rf is a $C_{1-6}$ perfluoroalkyl group, $R^3$ is a fluorine atom or a trifluoromethyl group, and b is an integer of from 0 to 5.

The monomer (1) may, for example, be $CF_3CF_2CH=CH_2$, $CF_3CF_2CF_2CF_2CH=CH_2$, $CF_3CF_2CF_2CF_2CF_2CF_2CH=CH_2$, $CF_3CF_2CF_2CF_2CF=CH_2$ or $CF_2HCF_2CF_2CF=CH_2$.

The monomer (2) may, for example, be $CF_3CF_2OCF_2CF_2OCF=CF_2$ or $C_3F_7OCF(CF_3)CF_2OCF=CF_2$.

Such another monomer is preferably the monomer (1), more preferably a monomer of the formula (1) wherein $R^1$ is a hydrogen atom and $R^2$ is a fluorine atom, particularly preferably $CF_3CF_2CF_2CF_2CH=CH_2$ or $CF_3CF_2CF_2CF_2CF_2CF_2CH=CH_2$, since it is thereby possible to improve the mechanical properties of ETFE.

In a case where ETFE is a copolymer having repeating units derived from another monomer other than E and TFE, the proportion of repeating units derived from such another monomer is preferably from 0.1 to 50 mol %, more preferably from 0.1 to 30 mol %, further preferably from 0.1 to 20 mol %, particularly preferably from 0.1 to 10 mol %, based on all repeating units (100 mol %) in ETFE. When the proportion of repeating units derived from such another monomer is within such a range, the properties such as stress cracking resistance, processability, etc. may be improved. The molecular weight of ETFE is not particularly limited, and ETFE ranging from a low molecular weight one which is liquid at 40° C. to a melt-moldable high molecular weight one may be widely used.

For example, in the case of ETFE having a molar ratio (E/TFE) of from 30/70 to 60/40 and having repeating units derived from $CF_3CF_2CF_2CF_2CH=CH_2$ in an amount of from 0.1 to 10 mol % based on all repeating units, the melt flow rate (MFR) which serves as an index for the molecular weight, is preferably from 0.01 to 50,000 g/10 min, more preferably from 0.1 to 2,000 g/10 min, further preferably from 0.3 to 100 g/10 min. When MFR is at least the lower limit value, molding by heat melting of ETFE becomes possible from the viewpoint of installation. When MFR is at most the upper limit value, the molded product will have a sufficient strength useful for practical applications.

Here, MFR is defined by the mass of ETFE flowing per 10 minutes (g/10 min) from a nozzle having a diameter of 2 mm and a length of 8 mm at 297° C. under a load of 5 kg/cm² as measured by a constant-load-orifice-type flow tester.

The concentration of ETFE microparticles in the raw material slurry (100 mass %) is preferably from 1 to 15 mass %, more preferably from 2 to 15 mass %, further preferably from 3 to 15 mass %. When the concentration of ETFE microparticles is at least the lower limit value, it is possible to reduce the heat energy required for distilling off the fluorinated organic solvent, thereby to reduce the operation cost. On the other hand, when the concentration of ETFE microparticles is at most the upper limit value, the dispersion stability of ETFE microparticles in the raw material slurry will be improved, whereby the handling efficiency of the raw material slurry will be improved.

(Polymerization Method)

ETFE is obtainable by polymerizing monomers including E and TFE as essential components and containing other monomers, as the case requires. The method for polymerizing such monomers is not particularly limited, and any method among a solution polymerization method, a suspension polymerization method, an emulsion polymerization, a bulk polymerization method, etc. may be employed. Among them, a solution polymerization method is preferred in which monomers including E and TFE are polymerized in a polymerization medium, since it is thereby possible to improve the gas absorption properties of E and TFE. The polymerization medium is preferably a fluorinated organic solvent, whereby the chain transfer coefficient is small.

The amount of the polymerization medium in the polymerization is preferably from 10 to 90 vol % based on the volume (100 vol %) of the polymerization tank. When the amount of the polymerization medium to be used, is at least the lower limit value, the amounts of the monomers to be dissolved or dispersed in the polymerization medium, and the obtainable ETFE, can be increased, whereby the yield of ETFE will be higher, such being industrially advantageous.

For the polymerization, a radical polymerization initiator is used. The radical polymerization initiator may, for example, be a perfluoro radical initiator such as a perfluoroalkyl peroxide or a perfluoroalkyl azo compound, a hydrocarbon peroxide, or a hydrocarbon azo compound.

The perfluoroalkyl peroxide may, for example, be an acyl peroxide obtainable by using a chlorocarbon or a fluorocarbon as the starting material. Specific examples include trichloroacetyl peroxide, bis(perfluoro-2-propoxypropionyl) peroxide, $[CF_3CF_2CF_2OCF(CF_3)COO]_2$, perfluoropropionyl peroxide, $(CF_3CF_2CF_2COO)_2$, $(CF_3CF_2COO)_2$, $\{CF_3CF_2CF_2[CF(CF_3)CF_2O]_cCF(CF_3)COO\}_2$ wherein c is an integer of from 0 to 8, $[ClCF_2(CF_2)_dCOO]_2$ wherein d is an integer of from 0 to 8, perfluorocyclohexane carbonyl peroxide, perfluorobenzene carbonyl peroxide, etc.

The perfluoroalkyl azo compound may, for example, be perfluoroazoisopropane, or $R^4N=NR^5$ wherein each of $R^4$ and $R^5$ is a $C_{1-8}$ linear or branched perfluoroalkyl group, such as $(CF_3)_2CFN=NCF(CF_3)_2$.

The hydrocarbon peroxide may, for example, be a dialkyl peroxide such as 2,5-dimethyl-2,5-bis(t-butylperoxy)hexane or di-t-butyl peroxide; a diacyl peroxide such as isobutyl peroxide, 3,5,5-trimethylhexanoyl peroxide, octanoyl peroxide, lauroyl peroxide, stearoyl peroxide or succinic acid peroxide; a peroxydicarbonate such as dinormalpropyl peroxydicarbonate, bis(4-t-butylcyclohexyl)peroxydicarbonate, di-2-ethoxyeritsu peroxydicarbonate or di-2-ethylhexyl peroxydicarbonate; or a peroxyester such as 1,1,3,3-tetramethylbutyl peroxyneodecanoate, 1-cyclohexyl-1-methylethyl peroxyneodecanoate, t-hexyl peroxyneodecanoate, t-hexyl peroxypivalate, t-butyl peroxypivalate, 1,1,3,3-tetramethylbutyl peroxy-2-ethyl hexanoate, 2,5-dimethyl-2,5-bis(2-ethylhexanoylperoxy)hexane, 1-cyclohexyl-1-methylethylperoxy-2-ethyl hexanoate, t-hexylperoxy-2-ethyl hexanoate, t-butylperoxy-2-ethyl hexanoate, t-butylperoxy isobutyrate, t-hexylperoxyisopropyl monocarbonate, t-butylperoxy-3,5,5-trimethyl hexanoate, t-butyl peroxylaurate, t-butylperoxyisopropyl monocarbonate or t-butyl peroxyacetate.

The hydrocarbon azo compound may, for example, be cyano-2-propylazoformamide, 1,1'-azobis(cyclohexane-1-carbonitrile), 2,2'-azobis(2-aminodinopropane)dihydrochloride, 2,2'-azobis(2-methylbutyronitrile), 2,2'-azobis(2,4-dimethylvaleronitrile), 2,2'-azobis[N-(2-propenyl)-2-methylpropionamide], a polydimethylcyloxane segment-containing macroazo compound, 2,2'-azobis(2-2,4,4-trimethylpentane), 2,2'-azobis(4-methoxy-2,4-dimethylvaleronitrile), 4,4'-azobis(4-cyanovaleric acid), dimethyl 2,2'-azobisisobutyrate, 2,2'-azobis[2-(2-imidazolin-2-yl)propane]dihydrochloride, 2,2'-azobis[2-(2-imidazolin-2-yl)propane]disulfate dehydrate, 2,2'-azobis[2-(2-imidazolin-2-yl)propane], 2,2'-azobis{2-methyl-N-[1,1-bis(hydroxymethyl)-2-hydroxyethyl]propionamide}, 2,2'-azobis{2-methyl-N-[1,1-bis(hydroxymethyl)ethyl]propionamide}, 2,2'-azobis[2-methyl-N-(2-hydroxyethyl)propionamide], 2,2'-azobisisobutylamide dihydrate or 2,2'-azobis[2-(hydroxymethyl)propionitrile].

The radical polymerization initiator is preferably a peroxide, particularly preferably t-butyl peroxypivalate.

The amount of the radical polymerization initiator to be used, is preferably from $10^{-6}$ to 10 parts by mass, more preferably from $10^{-5}$ to 5 parts by mass, further preferably from 0.005 to 1 part by mass, per 100 parts by mass of the total amount of monomers.

In the polymerization, a chain transfer agent may be used in order to control the molecular weight, or the physical or chemical properties. The chain transfer agent may, for example, be an alcohol such as methanol; a mercaptan such as ethyl mercaptan or butyl mercaptan; an alkyl halide such as an alkyl iodide, a perfluoroalkyl iodide, an alkyl bromide or a perfluoroalkyl bromide; a halogenated compound such as carbon tetrachloride, chloroform or sulfuryl chloride; an alkane such as ethane or methylcyclohexane; or a hydrochlorofluorocarbon such as $CHClFCF_2CF_2Cl$.

As the chain transfer agent, one type may be used alone, or two or more types may be used in combination.

The polymerization temperature may vary depending upon e.g. the type of the radical polymerization initiator, but is preferably from 0 to 100° C., more preferably from 30 to 90° C.

The polymerization pressure may vary depending upon e.g. the polymerization temperature, but is preferably from 0.1 MPa to 10 MPa, more preferably from 0.5 MPa to 3 MPa, further preferably from 0.8 MPa to 2 MPa.

The polymerization time is preferably from 0.1 to 30 hours, more preferably from 0.5 to 20 hours, further preferably from 1 to 15 hours, from the economical viewpoint.

When a fluorinated organic solvent is used as the polymerization solvent in a solution polymerization method, a slurry having ETFE microparticles dispersed in the fluorinated organic solvent is obtainable. The slurry obtained by the solution polymerization method may sometimes contain non-reacted monomers.

The concentration of ETFE microparticles in the slurry to be obtained by the solution polymerization method may vary depending upon conditions such as the polymerization temperature, the polymerization pressure, the polymerization time, etc., the charged amounts of monomers, etc., but is usually from about 0.1 to 45 mass %, preferably from 1 to 30 mass %.

As the raw material slurry in the present invention, it is preferred to use a slurry obtained by a solution polymerization method using a fluorinated organic solvent. Otherwise, ETFE obtained by various polymerization methods may be pulverized to microparticles, as the case requires, and then dispersed in a fluorinated organic solvent to prepare a slurry, which may be used as the raw material slurry.

The method for pulverizing ETFE to microparticles may, for example, be freeze pulverization, centrifugal pulverization or pulverization by means of an automatic mortar.

[ETFE Powder]

The average particle size of an ETFE powder produced by the production method of the present invention is preferably from 10 to 500 μm, more preferably from 20 to 400 μm, further preferably from 20 to 300 μm. When the average particle size of the ETFE powder is at least the lower limit value, the handling efficiency will be improved. Further, when the average particle size of the ETFE powder is at most the upper limit value, the flowability of the ETFE powder will be improved, whereby the handling efficiency will be excellent.

The average particle size of the ETFE powder means a value measured by a laser diffraction/scattering particle size/particle distribution measuring apparatus. Further, the bulk density of the ETFE powder is preferably from 0.4 to 1.8 g/mL, more preferably from 0.6 to 1.8 g/mL. When the bulk density of the ETFE powder is at least the lower limit value, the handling efficiency will be excellent. Further, the real density of the ETFE powder is about 1.8 g/mL, and therefore, the upper limit of the bulk density is 1.8 g/mL.

The bulk density of the ETFE powder is calculated by putting the ETFE powder into a container having a predetermined capacity and measuring the mass of the ETFE accommodated in the container.

Further, the content of the fluorinated organic solvent in the ETFE powder is preferably from 0.0001 to 50 mass %, more preferably from 0.001 to 30 mass %, further preferably from 0.001 to 10 mass %. When the content of the fluorinated organic solvent is at least the lower limit value, it is easy to avoid that the average particle size of the ETFE powder becomes too small, whereby the handling efficiency will be excellent. When the content of the fluorinated organic solvent is at most the upper limit value, the recovery rate of the fluorinated organic solvent will be improved, such being economically advantageous.

The content of the fluorinated organic solvent in the ETFE powder is measured by a gas chromatography method.

Usually, manufacturers of centrifugal thin-film evaporators recommend to lower the feeding linear velocity of the raw material for such a reason that as the feeding linear velocity of the raw material to be fed, is lowered, the retention time of the raw material in the heat-conducting barrel can be prolonged, whereby better performance is obtainable in drying. However, in the present invention, the feeding linear velocity of the raw material slurry is set to be a velocity exceeding 0.1 m/sec. That is, it has been found better to increase the velocity contrary to the manufacturers' recommendation. The reason is considered to be attributable to two factors i.e. the viscosity of the raw material slurry and the latent heat of the fluorinated organic solvent. That is, the raw material slurry having ETFE microparticles dispersed in the fluorinated organic solvent has a high viscosity and tends to be hardly wet-spreaded over the entire inside wall surface of the heat-conducting barrel. Therefore, at such a lower feeding linear velocity as recommended by the manufacturers, the raw material slurry tends to locally flow in the heat-conducting barrel, whereby the retention time of the raw material slurry in the heat-conducting barrel tends to be short. On the other hand, by setting the feeding linear velocity to be a velocity exceeding 0.01 m/sec., the raw material slurry is considered to be uniformly wet-spreaded over the inside wall surface of the heat-conducting barrel and stay for a sufficient time in the heat-conducting barrel. Further, the fluorinated organic solvent has a low latent heat, and therefore, it is considered that such a solvent is likely to be readily and sufficiently evaporated even if the retention time of the raw material slurry in the heat-conducting barrel becomes short.

As described above, according to the method for producing an ETFE powder of the present invention, the raw material slurry is fed into the centrifugal thin-film evaporator at a feeding linear velocity exceeding 0.10 m/sec., whereby volatile components will be sufficiently removed, and an ETFE powder having a small average particle size and being excellent in the handling efficiency and processability will be obtained. Further, in the method for producing an ETFE powder of the present invention, a solid-liquid separation operation in the method (2) as mentioned in Background Art is not required, or waste water will not be formed, whereby the operation is simple, and the recovery rate of volatile components is also improved since no water is used.

Further, the method for producing an ETFE powder of the present invention is not limited to one using the above production apparatus 1.

EXAMPLES

Now, the present invention will be described in detail with reference to Examples, but it should be understood that the present invention is by no means limited by the following description. Ex. 1 is a Preparation Example, Ex. 2 and 3 are Working Examples of the present invention, and Ex. 4 and 5 are Comparative Examples.

[Measuring Methods]
1. Copolymer composition of ETFE

The copolymer composition of ETFE was measured by FT-IR.

2. Content of volatile components in ETFE powder

The content of volatile components in an ETFE powder obtained in each of Examples and Comparative Examples was obtained by mixing the obtained ETFE powder and toluene in a mass ratio of 1:1, extracting volatile components remaining in the ETFE powder into the toluene phase by centrifugal separation, and then measuring the toluene phase by gas chromatography (Gas Chromatography GC-6890, manufactured by Agilent Technologies).

3. Average particle sizes of ETFE microparticles and ETFE powder

The average particle sizes of ETFE microparticles in a raw material slurry and an obtained ETFE powder, were measured by means of a laser diffraction/scattering type particle size/particle size distribution measuring apparatus.

4. Bulk density of ETFE powder

The bulk density of an ETFE powder was calculated by putting the ETFE powder into a container having a predetermined capacity and measuring the mass of the ETFE powder accommodated in the container.

5. MFR of ETFE

The mass of ETFE flowing out for 10 minutes (g/10 min) from a nozzle having a diameter of 2 mm and a length of 8 mm was measured by means of a Kouka-shiki flow tester under conditions of 297° C. and a load of 5 kg/cm$^2$.

Ex. 1

To a fluorinated organic solvent having $CF_3CF_2CF_2CF_2CF_2CF_2H$ and $CHClFCF_2CF_2Cl$ mixed in a mass ratio of 62.8/37.2, E, TFE and $C_4F_9CH=CH_2$ were added and subjected to polymerization by a solution polymerization method to obtain a raw material slurry having a three-component copolymer (hereinafter referred to as "ETFE 1") dispersed in the fluorinated organic solvent.

The composition of ETFE 1 was repeating units derived from E/repeating units derived from TFE/repeating units derived from $C_4F_9CH=CH_2=44.7/53.9/1.47$. MFR of ETFE 1 was 1.41 g/10 min. The content of microparticles of ETFE 1 in the raw material slurry was measured by a heated mass reduction and was found to be 7 mass %.

Ex. 2

Using the production apparatus 1 exemplified in FIG. 1, an ETFE powder 1 was produced from the raw material slurry of ETFE 1 obtained in Ex. 1. The heat-conducting barrel 34 in the centrifugal thin-film evaporator 12 had an inner diameter of 150 mm and a barrel length of 300 mm. Further, the clearance between the front edges of the stirring blades 40 and the inside wall surface 34a of the heat-conducting barrel 34 was 0.7 mm. The nozzle 50 was installed so that the angle θ (FIG. 2) between the feeding direction of the raw material slurry into the heat-conducting barrel 34 and the tangential direction of the inside wall surface 34a at the intersection of an extended line in the feeding direction and the inside wall surface 34a of the heat-conducting barrel 34, became 25°.

The raw material slurry obtained in Ex. 1 was stored in the storage tank 10, the internal temperature of the centrifugal thin-film evaporator 12 was adjusted to 130° C. and the internal pressure was adjusted to 53 kPa, then, the raw material slurry in the storage tank 10 was transported via the piping 24 at a flow rate of 93 kg/hr and fed into the heat-conducting barrel 34 from the nozzle 50, and ETFE powder 1 formed by evaporation of volatile components was recovered from the powder-receiving portion 46. The feeding linear velocity of the raw material slurry fed into the heat-conducting barrel 34 from the nozzle 50 was 0.13 m/sec. Further, the rotary stirring portion 42 was driven at a stirring rotational speed of 1,200 rpm.

The obtained ETFE powder 1 had a volatile components content of 3.2 mass %, an average particle size of 55 µm and a bulk density of 0.8 g/mL, and its handling efficiency and processability were good.

Ex. 3

Using the production apparatus 1 exemplified in FIG. 1, the raw material slurry obtained in Ex. 1 was stored in the storage tank 10, the internal temperature of the centrifugal thin-film evaporator 12 was adjusted to 130° C. and the internal pressure was adjusted to 100 kPa (the atmospheric pressure), then, the raw material slurry in the storage tank 10 was transported via the piping 24 at a flow rate of 100 kg/hr and fed into the heat-conducting barrel 34 from the nozzle 50, and ETFE powder 2 formed by evaporation of volatile components was recovered from the powder-receiving portion 46. The feeding linear velocity of the raw material slurry fed into the heat-conducting barrel 34 from the nozzle 50 was 0.14 m/sec. Further, the rotary stirring portion 42 was driven at a stirring rotational speed of 1,200 rpm.

The obtained ETFE powder 2 had a volatile components content of 1.1 mass %, an average particle size of 50 µm and a bulk density of 0.67 g/mL, and its handling efficiency and processability were good.

Ex. 4

ETFE powder 3 was recovered in the same manner as in Ex. 3 except that the raw material slurry of the storage tank 10 was transported at a flow rate of 75 kg/hr, and the feeding linear velocity of the raw material slurry fed from the nozzle 50 was adjusted to be 0.10 m/sec.

The obtained ETFE powder 3 was agglomerates having a volatile components content of 62.7 mass % and a broad particle size distribution with an average particle size of about 600 µm, and as compared with ETFE 2 obtained in Ex. 3, its handling efficiency and processability were inferior.

Ex. 5

ETFE powder 4 was recovered in the same manner as in Ex. 2 except that the raw material slurry of the storage tank 10 was transported at a flow rate of 50 kg/hr, and the feeding linear velocity of the raw material slurry fed from the nozzle 50 was adjusted to be 0.07 m/sec.

The obtained ETFE powder 4 was agglomerates having a volatile components content of 65.1 mass % and a broad particle size distribution with an average particle size of about 600 μm, and as compared with ETFE 1 obtained in Ex. 2, its handling efficiency and processability were inferior.

INDUSTRIAL APPLICABILITY

According to the method for producing an ETFE powder of the present invention, it is possible to produce an ETFE powder which is excellent in handling efficiency and processability and which is useful for applications such as molding process, resin blending, etc.

This application is a continuation of PCT Application No. PCT/JP2012/068336, filed on Jul. 19, 2012, which is based upon and claims the benefit of priority from Japanese Patent Application No. 2011-157879 filed on Jul. 19, 2011. The contents of those applications are incorporated herein by reference in its entirety.

REFERENCE SYMBOLS

1: Apparatus for production of ETFE powder
10: Storage tank
12: Centrifugal thin-film evaporator
14: Condenser
16: Recovery tank
18: Blower
20: Feeding pump
22: Back pressure valve
24, 26, 28, 32: Piping
30: Pressure-adjusting valve
34: Heat-conducting barrel
34a: Inside wall surface
34b: Raw material feeding port
34c: Volatile components-recovering port
36: Dispersing rotor
38: Rotary shaft
40: Stirring blade
42: Rotary stirring portion
44: First heating portion
46: Powder-receiving portion
48: Second heating portion
50: Nozzle

What is claimed is:

1. A method for producing an ethylene/tetrafluoroethylene-containing copolymer powder from a slurry having ethylene/tetrafluoroethylene-containing copolymer microparticles dispersed in a fluorinated organic solvent, by means of a centrifugal thin-film evaporator having a cylindrical heat-conducting barrel, a rotary stirring portion wherein a rotary shaft is provided with stirring blades for rotation in the heat-conducting barrel so that the front edges of the stirring blades skim over the inside wall surface of the heat-conducting barrel, and a heating portion for heating the heat-conducting barrel, wherein
the fluorinated organic solvent is at least one member selected from the group consisting of a perfluorocarbon, a hydrofluorocarbon, a hydrochlorofluorocarbon and a hydrofluoroether,
the centrifugal thin-film evaporator has an internal temperature during the method of 30 to 180° C., and
the slurry is fed into the heat-conducting barrel at a feeding linear velocity exceeding 0.1 m/sec.

2. The method according to claim 1, wherein
the angle θ between the feeding direction of the slurry into the heat-conducting barrel and the tangential direction of the inside wall surface at the intersection of an extended line in the feeding direction and the inside wall surface of the heat-conducting barrel, is at most 30°.

3. The method according to claim 1, wherein
the concentration of the microparticles in the slurry is from 1 to 15 mass %.

4. The method according to claim 1, wherein
the content of the fluorinated organic solvent in the ethylene/tetrafluoroethylene-containing powder withdrawn from the centrifugal thin-film evaporator, is from 0.0001 to 50 mass %.

5. The method according to claim 1, wherein
the slurry is a slurry obtained by solution polymerization of monomers comprising ethylene and tetrafluoroethylene.

6. The method according to claim 1, wherein
the average particle size of the ethylene-tetrafluoroethylene powder withdrawn from the centrifugal thin-film evaporator, is from 10 to 500 μm.

7. The method according to claim 1, wherein
the bulk density of the ethylene/tetrafluoroethylene-containing copolymer powder withdrawn from the centrifugal thin-film evaporator, is from 0.4 to 1.8 g/mL.

8. The method according to claim 1, wherein
the fluorinated organic solvent is $CF_3(CF_2)_nCF_2H$, $CHClFCF_2CF_2Cl$, or a mixture thereof,
wherein n is an integer of from 4 to 18.

9. The method according to claim 1, wherein
in the ethylene/tetrafluoroethylene-containing copolymer, the molar ratio of repeating units derived from ethylene to repeating units derived from tetrafluoroethylene is from 30/70 to 60/40.

10. The method according to claim 1, wherein
the ethylene/tetrafluoroethylene-containing copolymer has repeating units derived from another monomer other than ethylene and tetrafluoroethylene.

11. The method according to claim 10, wherein said another monomer is a monomer represented by formula (1):

$$CH_2=CR^1-(CF_2)_aR^2 \tag{1}$$

where, in the formula (1), each of $R^1$ and $R^2$ which are independent of each other, is a hydrogen atom or a fluorine atom, and a is an integer of from 1 to 12.

12. The method according to claim 1, wherein volatile components are present in the powder of the ethylene/tetrafluoroethylene-containing copolymer, and the volatile components are present in an amount not more than 3.2 mass %, relative to the mass of the powder.

13. The method according to claim 12, wherein
the average particle size of the ethylene-tetrafluoroethylene powder withdrawn from the centrifugal thin-film evaporator, is from 20 to 400 μm.

14. The method according to claim 12, wherein
the average particle size of the ethylene-tetrafluoroethylene powder withdrawn from the centrifugal thin-film evaporator, is from 20 to 300 μm.

15. A method, comprising:
feeding a slurry into a heat-conducting barrel, present in a centrifugal thin-film evaporator, at a feeding linear velocity exceeding 0.1 m/sec, said slurry comprising microparticles of an ethylene/tetrafluoroethylene-containing copolymer dispersed in a fluorinated organic solvent; and recovering a powder of said ethylene/tetrafluoroethylene-containing copolymer from said centrifugal thin-film evaporator, wherein said heat-conducting barrel is present in a centrifugal thin-film evaporator having a cylindrical heat-conducting barrel, a rotary stirring portion wherein a rotary shaft is provided with stirring blades for rotation in the heat-conducting barrel so that the front edges of the stirring blades skim over the inside wall surface of the heat-conducting barrel, and a heating portion for heating the heat-conducting barrel, wherein the fluorinated organic solvent is at least one member selected from the group consisting of a perfluorocarbon, a hydrofluorocarbon, a hydrochlorofluorocarbon and a hydrofluoroether, and the centrifugal thin-film evaporator has an internal temperature during the method of 30 to 180° C.

* * * * *